Patented Sept. 2, 1941

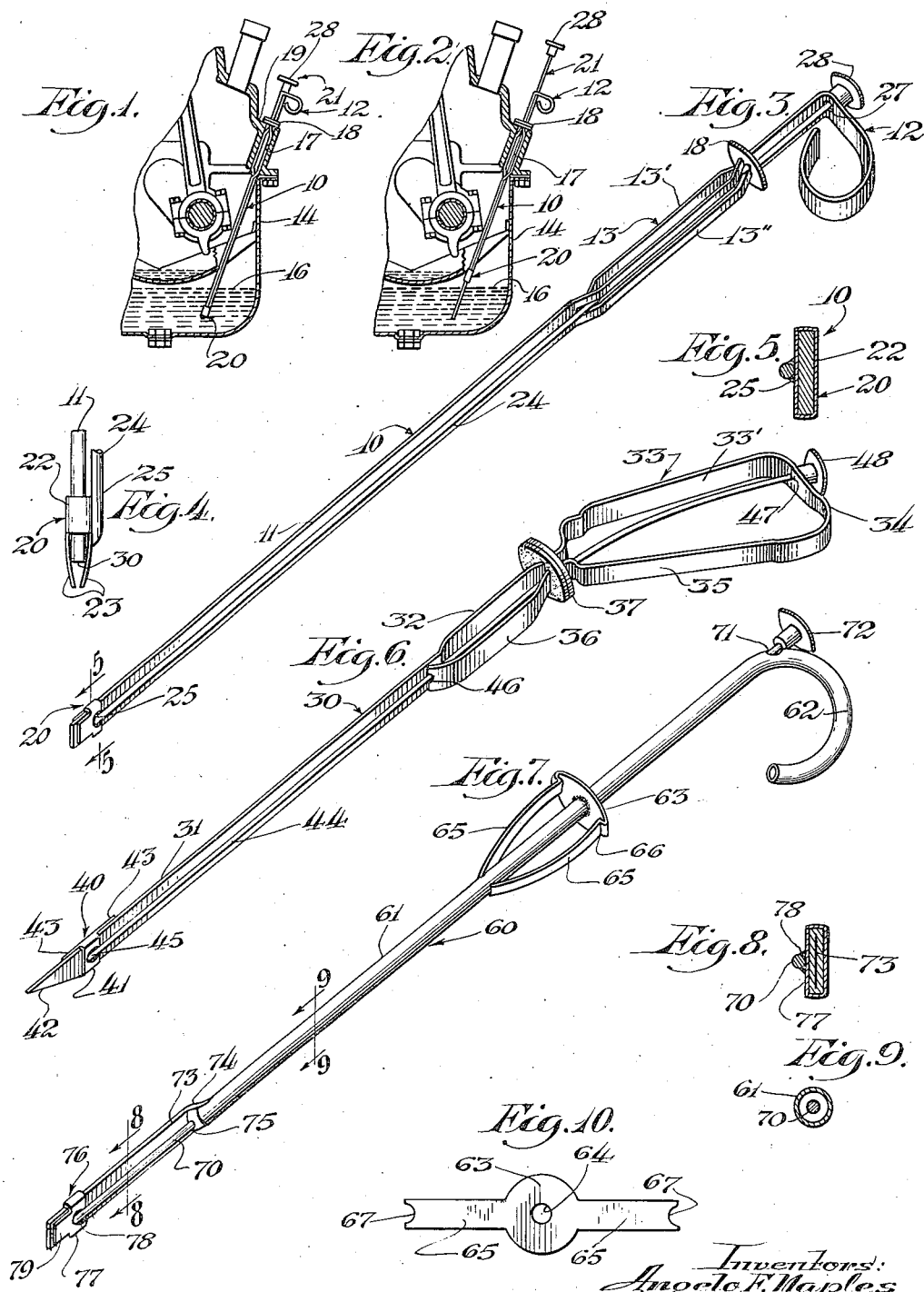

2,254,662

UNITED STATES PATENT OFFICE 2,254,662

OIL GAUGE ROD

Angelo F. Naples and Sabastiano Lando, Chicago, Ill.

Application December 13, 1940, Serial No. 369,992

10 Claims. (Cl. 33—126.7)

This invention relates generally to gauge rods and more particularly to such rods adapted for measuring or determining the level of the oil in the crank case of an automotive engine or the like.

The conventional oil gauge rods now employed in most automotive engines are of the type which extend through a suitable opening in the crank case of the automobile so that the lower end of the rod extends downwardly to a point considerably below the normal oil level in the crank case. When it is desired to determine the oil level, it is first necessary to remove such a conventional oil gauge rod from the crank case and to wipe from the surface of the rod any excess oil which may have splashed on the rod during operation of the engine. The oil gauge rod is then replaced in its normal position so that its lower end projects downwardly into the oil in the crank case, and by again withdrawing the oil gauge rod from the crank case, it is possible to determine the oil level in the crank case by reason of the film of oil which has been formed on the rod up to the actual level of such oil in the crank case. It will be understood, of course, that suitable gauge marks are usually provided on rods of this character so that the user may compare the indicated oil level with the most desirable oil level as shown by the gauge marks on the rod.

The primary object of the present invention is to enable such oil gauge rods to be used in determining the oil level in a crank case without the necessity of withdrawing the oil gauge rod for a preliminary manual wiping or cleaning operation; and a further and ancillary object is to provide such a self-wiping oil gauge rod which may be utilized as a replacement for conventional oil gauge rods without the necessity for modifying or enlarging the aperture in the crank case with which it is to be used.

Efforts have heretofore been made to produce a self-wiping oil gauge rod, but in most instances these prior efforts have involved the use of complicated structures which have necessitated the enlargement of the opening in the crank case or have involved a relatively complicated mode of operation, and a further object of the present invention is to provide such an oil gauge rod which embodies a relatively simple mode of operation and which is simple in structure and capable of economical manufacture.

Other and further objects related to the foregoing are to provide a self-wiping oil gauge rod construction which is readily adaptable to various types of gauge rod construction; to provide a self-wiping oil gauge rod which is so constructed and arranged that filling station attendants may readily recognize its construction so as to insure that the oil gauge rod of the present invention will be effectively utilized in every instance; to enable a measuring gauging portion of the oil gauge rod to be wiped while the oil gauge rod remains in its normal position in the crank case; to enable such wiping to be accomplished by but a relatively short range of movement of the wiper; and to construct a self-wiping oil gauge rod so that mistakes of an operator respecting the intended mode of operation of the wiping means will not give a false indication of the oil level and will not disrupt the measuring operation or inconvenience the operator.

Other and further objects of the present invention will be apparent from the following description and claims and it will be understood by reference to the accompanying drawing which, by way of illustration, shows preferred embodiments and the principle thereof and what we now consider to be the best mode in which we have contemplated applying that principle. Other embodiments of the invention embodying the same or equivalent principle may be used and structural changes may be made as desired by those skilled in the art without departing from the present invention and the purview of the appended claims.

In the drawing,

Fig. 1 is a fragmental cross-sectional view of an automotive engine equipped with a self-wiping oil gauge rod embodying the features of the invention, the rod being shown in Fig. 1 in its normal relationship;

Fig. 2 is a similar fragmental view illustrating the wiper means of the present oil gauge rod in a withdrawn or actuated position;

Fig. 3 is an enlarged perspective view of one form of a self-wiping oil gauge rod embodying the features of the invention;

Fig. 4 is a fragmental side elevational view of the oil gauge rod shown in Fig. 3 illustrating the construction of the wiping means;

Fig. 5 is an enlarged cross-sectional view taken along the line 5—5 of Fig. 3;

Fig. 6 is an enlarged perspective view illustrating another form of oil gauge rod embodying the features of the present invention;

Fig. 7 is an enlarged perspective view illustrating still another oil gauge rod embodying the features of the present invention;

Fig. 8 is an enlarged cross-sectional view taken along the line 8—8 of Fig. 7;

Fig. 9 is an enlarged cross-sectional view taken along the line 9—9 of Fig. 7; and Fig. 10 is a plan view showing the blank from which the closure or positioning disc employed on the gauge rod of Fig. 7 is produced.

In the form chosen for disclosure in Figs. 1 to 5 of the drawing, the invention is embodied in an oil gauge rod 10 formed from an elongated strip 10 of sheet steel to provide a lower body portion or gauging portion 11 and an upper handle portion 12 with an intermediate mounting or positioning portion 13 which serves to hold the oil gauge rod 10 in the desired operative relation in the crank case 14 of an automotive engine or the like. The oil gauge rod 10 is normally positioned so that its lower end portion or gauging portion 11 is located within the crank case 14, the extreme lower end of the gauge rod being located beneath the normal oil level 16 in the crank case 14. To so position the gauge rod 10 an elongated bore or passage 17 is provided in the upper portion of the crank case 14, this bore in the present case being formed in a portion of the block of the engine. Within the bore 17 means is provided on the gauge rod 10 to engage the sides of the bore and thereby position and frictionally hold the gauge rod 10 in the desired relation. In the embodiment illustrated in Figs. 1 to 5, this holding means 13 is formed by striking an elongated central portion 13' of the gauge rod 10 out of the plane of the remainder of the gauge rod material and by oppositely striking the two elongated portions located on opposite sides of the portion 13' so as to provide two laterally spaced elongated portions 13'' which are located out of the plane of the material of the balance of the gauge rod. Thus the two portions 13'' will engage one surface of the elongated bore or opening 17 while the other portion 13' will engage the opposite side of the bore, and the dimensioning of the parts is such that a firm frictional fit will be attained.

Above the positioning portion 13, a stop means such as a stop disc 18 is fixed upon the gauge rod 10 in surrounding relation thereto and when the gauge rod is inserted into the crank case through the opening or bore 17, this disc 18 engages the outer surface 19 of the crank case to limit the downward movement of the gauge rod. Since the longitudinal position of the gauge rod 10 is thus accurately determined by the positioning or stop disc 18, the oil level in the crank case 14 may be determined by the upward extent of an oil film which is found on the gauging portion 11 of the gauge rod 10 when it is withdrawn from the crank case 14. It will be evident, of course, that during operation of the automotive engine or the like with which the rod is associated, oil will be splashed upon the gauge rod 10 above the actual level of the oil in the crank case, and with oil gauge rods of ordinary construction it is necessary to withdraw the gauge rod from the crank case and to wipe excess oil from the gauge rod before a measuring operation is performed. The gauge rod is then reinserted into the opening in the crank case so that the gauge rod is related thereto in the normal desired relationship. The lower end of the gauge rod will then extend into the body of oil in the crank case and a film of oil will be formed on that portion of the rod which extends into the body of oil. This film of oil will, of course, remain on the gauge rod when it is again removed, thereby to indicate the level of the oil contained in the crank case.

In accordance with the present invention the oil gauge rod 10 is constructed and arranged to incorporate a wiping means through the use of which the splashed oil may be wiped from the oil gauge rod while the oil gauge rod remains in its normal position in the crank case, and as a result, a simple wiping operation may be performed and the oil gauge rod may thereafter be immediately withdrawn so that measurement is obtained without the necessity for a preliminary withdrawal and re-insertion of the oil gauge rod. To this end a wiping means 20 is mounted on the oil gauge rod 10 for reciprocating movement along the lower portion of the gauge rod 10 while the oil gauge rod remains in its normal position in the crank case, and such actuation of the wiping means 20 is effected through the medium of an actuating member 21 which is connected to the wiping means 20 and extends along the oil gauge rod in close association therewith to a point beyond the handle means 12 so that the actuating means 21 may be grasped and moved through an operating cycle while the oil gauge rod 10 remains in its normal position in the crank case. In the present instance the wiping means 20 is metallic in character and is formed from a continuous band 22 of resilient material such as brass which surrounds the gauging portion 11 of the oil gauge rod so as to be slidable therealong. If desired the fit between the band 22 and the body portion 11 may be relatively tight so that in longitudinal reciprocation of the band 22 along the gauging portion 11 the desired wiping action will be attained, but in the form illustrated in Figs. 1 to 5, we have also provided resilient fingers 23 which engage the opposite flat surfaces of the body member 11 with a resilient action, thereby to attain a better and more thorough wiping action. These resilient fingers 23 are preferably formed integrally with the band 22.

The actuating means 21 preferably comprises a relatively small diameter wire 24 which is relatively stiff and resilient in character, and the lower end of the rod 24 is secured to the band 22 of the wiping means 20 as by soldering at 25. The wire 24 extends along one flat face of the gauge rod 10, and in the present instance it is so arranged as to extend between the two laterally spaced portions 13'' and thence through a suitable opening in the positioning disc 18 and an opening 27 formed in the handle portion 12. A suitable handle means may also be provided on the projecting upper end of the wire 24 and in the present instance such a handle means is provided by a sheet metal disc 28 which is secured to the upper end of the wire 24. In the form shown in Figs. 1 to 5, the resilient fingers 23 of the wiping means 20 are arranged in such a manner that when the wiping means is in its lowermost position, the fingers 23 extend slightly beyond the lower end 30 of the gauge rod and hence the resiliency of the fingers 23 acts in such an instance to maintain the wiping means in its lowermost position. The handle 28 may, of course, be grasped by a user to withdraw the wiping means 20 in an upward direction along the body of the gauge rod 10, and in such operation the two resilient fingers 23 are spread apart and move along the opposite flat surfaces of the gauge rod 10 to wipe excess oil from such surfaces. The lowermost position of the wiper 20 may be determined in different ways, but we prefer to attain this limiting action by so proportioning the wire 24 that the handle or disc 28 thereof will strike the handle 12 of the rod 10 when the wiper 20 reaches the desired limit of downward movement.

It will be evident from Figs. 1 and 2 of the drawing that the range of upward withdrawing movement required for the wiping means 20 may be relatively small, since it is only necessary to move the wiping means 20 for a short distance above the normal oil level 16. It is contemplated, of course, that the wiping means 20 will normally be returned at once to its lowermost position, that is, prior to the withdrawal of the gauge rod 10, but it will be evident that failure of an operator to so return the wiping means 20 to its lowermost position at this time will not in any way disrupt the measuring operation, since in the upward withdrawal of the wiping means 20, the excess oil will have been wiped from the rod to a point above the actual oil level 16. An accurate gauging or measuring operation will, therefore, be attained even though the operator may not employ the preferred mode of operation or manipulation.

In many instances the design of an automotive engine may require special formation or construction of the oil gauge rod to be employed therewith, and the self-wiping characteristics of the present invention are readily adaptable to the production of self-wiping oil gauge rods for such automotive engines. Thus in Fig. 6 of the drawing there is illustrated a self-wiping oil gauge rod 30 which is constructed for one type of automotive engine which requires special formation of the oil gauge rod. This particular oil gauge rod 30 has its handle means extending laterally at a substantial angle to the longitudinal axis of the gauge rod. The oil gauge rod 30 is formed from a flat metallic strip of sheet metal to provide a lower body portion or gauging portion 31 which, adjacent its upper end, is offset as at 32 to provide a resilient portion for engagement with the side of a bore such as the bore 17. Upwardly beyond the offset portion 32 the metal strip is bent to provide a relatively long and angularly disposed handle 33. The handle 33 includes an upper side member 33', which has an upper connecting portion extending therefrom as designated at 34. From the connecting portion 34 a lower side portion 35 extends to a point adjacent the upper end of the offset portion 32 at which point the metal strip is bent to provide another offset portion 36 opposite the portion 32 for engagement with the opposite side of such a bore 17. Above the offset portions 32 and 36 a positioning disc 37 surrounds the two adjacent portions of the metal strip, this positioning disc 37 functioning in the same general manner as the positioning disc 18 of Fig. 3 to limit the downward movement of the gauge rod 30 as it is placed in position in a crank case such as the crank case 14. The two offset portions 32 and 36 act as a positioning portion or means to properly locate the gauge rod 30 in a lateral direction and also function to frictionally engage opposite sides of a bore such as the bore 17 thereby to hold the gauge rod in the desired relation to the crank case.

The gauge rod 30 of Fig. 6 is provided with a wiper means 40 which is preferably formed from a resilient material such as brass to provide a band 41 encircling the lower or gauging portion 31 of the gauge rod 30. The gauge rod 30 is of the type having a pointed end 42 which facilitates insertion of the gauge rod into the opening 17, and the wiper 40 is therefore arranged so that in its lowermost position it is just above the tapered side edge which provides the point 42. With this construction the band 41 preferably has a pair of integrally formed spring fingers 43 projecting in opposite directions along one side surface of the body portion 31, these spring fingers being operative to wipe along the surface of the gauge rod upon which they bear and acting to hold the opposite side of the loop 41 in a firm wiping engagement with the opposite side of the body or gauging portion 31.

The wiper means 40 of Fig. 6 has an actuating means formed by a thin resilient wire 44 which is secured as by means of soldering at 45 to the band 41, and the wire 44 extends along the adjacent surface of the body 31 so as to project through a notch 46 formed in the adjacent end of the offset portion 36. The wire 44 extends between the two offset portions 32 and 36 and through the spacing washer 37 in the space which is therein provided between the two adjacent portions of the metallic strip. The wire 44 is then bent slightly so as to extend along but in spaced relation to the upper side member 33' of the handle 33 and passes through a suitable opening 47 formed in the cross member 34 of the handle. At its upper end the wire has a handle means such as a disc 48 secured thereto so that an operator may actuate the wiper means 40 in the same general manner as hereinbefore described with reference to Figs. 1 to 5. It will be noted that the resiliency of the wire 44 provides for actuation of the wiper means 40 in a definite and predetermined manner, the wire 44 in its intermediate portions being guided by the notch 46 and being also guided at the point at which it passes through the positioning disc 37. Hence the wire 44 is flexed during the wiping operation but its resiliency is sufficient, when taken in connection with the aforesaid guiding action, to insure against bending of the wire or otherwise disrupting the desired mode of operation of the device. The handle 48 is so located on the wire 44 that when the handle 48 engages the cross member 34 the wiper 40 will be in its aforesaid lowermost position along the gauging portion 31 of the gauge rod 30.

In Figs. 7 to 10 of the drawing, there is illustrated an alternative embodiment of the invention wherein the oil gauge rod 60 is formed from tubular stock rather than from flat stock. Thus the gauge rod 60 of Fig. 7 is formed to provide a body portion 61 formed from a straight tubular member as indicated in Fig. 9, and at its upper end the tubular member is bent to form a hook-like handle 62. The gauge rod 60 has a positioning disc 63 surrounding the tubular body portion 61 at an appropriate position therealong, the disc 63 being secured in position on the tubular body portion 61 by any preferred means such as welding. The disc 63 is in the present instance arranged to incorporate means for positioning the gauge rod 60 in a mounting opening such as the bore 17. Thus the disc 63 is initially formed as a blank having the shape illustrated in Fig. 10, the disc having a central opening 64 to receive the tubular body portion 61 and having integral arms 65 extending in opposite directions therefrom. These arms 65 are bent back against the lower side of the disc 63 to provide shoulders 66 for engagement with an upper surface such as the surface 19 to limit inward or downward movement of the gauge rod. Other portions of the arms 65 are bent so as to extend downwardly along but in spaced relation to the tubular member 61 so that the lower ends gradually converge toward and into engagement with the opposite sides of the tubular member 61. The lower ends of the arms 65 are preferably formed with arcuate notches 67 therein to embrace opposite sides of the tubular member 61.

Where the gauge rod is formed from tubular stock in the general manner illustrated in Figs. 7 to 9 of the drawing, the tubular character of the stock is utilized in providing a mounting for the wiper actuating means. Thus a relatively thin resilient wire 70 is provided which extends through an opening 71 formed in the handle portion 62 in alignment with the straight body portion 61 of the gauge rod. This wire 70 has a handle such as a disc 72 secured at its upper end for manual engagement and actuation of the wire 71 with relation to the gauge rod.

Adjacent its lower end the tubular gauge rod 60 is flattened as illustrated at 73 in Figs. 7 and 8, thereby to provide a pair of oppositely facing flat surfaces upon which the extent of the film of oil may be readily discerned. The flattened portion 73 is preferably offset laterally to a considerable extent from the axis of the tubular member 61, as illustrated at 74 in Fig. 7, and a suitable opening 75 is formed therein in alignment with the axis of the straight body portion 61 of the gauge rod so that the wire 70 may extend downwardly through the opening 75 for operative association with a wiper means such as that illustrated at 76. The wiper means 76 is preferably formed from a resilient material such as brass to provide a loop 77 encircling the flattened portion 73 as illustrated in Figs. 7 and 8, and the lower end of the wire 70 is secured to the wiper means as by soldering at 78. The band 77 may also have an integral spring finger 79 for wiping along one of the flat surfaces of the portion 73 of the gauge rod 60.

The longitudinal extent of the flattened portion 73 is, of course, sufficient to provide for the desired range of measurement or gauging action, it being observed, however, that the upper extent of the flatened portion 73, as defined by the offset 74, is preferably such that when the wiper means 76 is fully withdrawn to the extent determined by the offset 74, the wiper means 76 will have passed a substantial distance above the normal oil level so as to provide for a clearly distinguishable indication of the oil level.

From the foregoing description it will be apparent that the present invention provides an improved self-wiping oil gauge rod having an extremely simple mode of operation, and it will also be observed that this novel mode of operation is such that a misunderstanding concerning the mode of operation will not entail a false or misleading indication of the oil level nor will it entail additional measuring or gauging operations. The self-wiping oil gauge rod of the present invention is extremely simple in structure and effective and efficient in its operation, and the construction is such that the self-wiping oil gauge rod of the present invention may be installed in automotive engines of conventional construction without changes in the mounting means required for the gauge rod.

It will be understood that in the foregoing we have illustrated and described what we now consider to be the preferred embodiments of our invention, and that these are capable of variation and modification and we therefore do not wish to be limited to the precise details set forth but desire to avail ourselves of such changes and alterations as fall within the scope of the following claims.

We claim:

1. A self-wiping oil gauge rod of the character described comprising an elongated and relatively stiff gauge rod having a lower gauging portion, an intermediate positioning portion, and a handle portion, a positioning stop means mounted on said gauge rod intermediate said positioning portion and said handle portion and operable to limit the extent of insertion of the gauge rod into a crank case or the like, wiper means mounted on the gauging portion of said rod for longitudinal reciprocation therealong, and means for actuating said wiper means comprising an elongated resilient wire secured to said wiping means and mounted for reciprocation, said wire extending along said gauging portion and said positioning portion to a point adjacent said handle portion whereby said wiper means may be reciprocated along said gauging portion of said gauge rod while said gauge rod remains in its normal position in association with a crank case or the like.

2. A self-wiping oil gauge rod as defined in claim 1 wherein said actuating wire is laterally supported and guided by said positioning stop means and by said handle portion.

3. A self-wiping oil gauge rod comprising an elongated and relatively stiff gauge rod having a lower gauging portion, an intermediate positioning portion, and a handle portion, a positioning stop means mounted on said gauge rod intermediate said positioning portion and said handle portion and operable to limit the extent of insertion of the gauge rod into a crank case or the like, wiper means mounted on the gauging portion of said rod for longitudinal reciprocation therealong, and means for actuating said wiper means comprising an elongated resilient wire secured at one end to said wiping means so as to be supported and guided at said one end by said wiping means, said wire extending along said gauging portion and said positioning portion to a point beyond said handle portion, means on said positioning portion operable to engage and guide said wire while permitting reciprocation of said wire to move said wiper means back and forth along said gauging portion of said gauge rod while said gauge rod remains in its normal position in association with a crank case or the like, and means on said wire adapted to engage a portion of said handle to limit movement of said wiper means downwardly along said gauging portion.

4. A self-wiping oil gauge rod comprising an elongated and relatively stiff gauge rod having a lower gauging portion, an intermediate positioning portion, and a handle portion, a positioning stop means mounted on said gauge rod intermediate said positioning portion and said handle portion and operable to limit the extent of insertion of the gauge rod into a crank case or the like, wiper means mounted on the gauging portion of said rod for longitudinal reciprocation therealong, and means for actuating said wiper means comprising an elongated resilient wire secured at one end to said wiping means so as to be supported and guided at said one end by said wiping means, said wire extending along said gauging portion and said positioning portion to a point beyond said handle portion, means on said positioning portion operable to engage and guide said wire while permitting reciprocation of said wire to move said wiper means back and forth along said gauging portion of said gauge rod while said gauge rod remains in its normal position in association with a crank case or the like, and handle means on the upper end of said wire adapted in downward movement of said wire to engage said handle portion of said rod to thereby limit the downward range of movement of said wiper means.

5. A self-wiping oil gauge rod of the character described comprising an elongated and relatively stiff gauge rod having a lower gauging portion, an intermediate positioning portion, and a handle portion, a positioning stop means mounted on said gauge rod intermediate said positioning portion and said handle portion and operable to limit the extent of insertion of the gauge rod into a crank case or the like, an elongated resilient wire mounted for reciprocation along said gauge rod and extending along said gauging portion and said positioning portion to a point adjacent said handle portion, and wiper means comprising a resilient metallic band slidably surrounding said gauging portion in snug embracing relation thereto and secured to said wire for reciprocation by said wire along said gauging portion of said rod.

6. A self-wiping oil gauge rod of the character described comprising an elongated and relatively stiff gauge rod having a lower gauging portion, an intermediate positioning portion, and a handle portion, a positioning stop means mounted on said gauge rod intermediate said positioning portion and said handle portion and operable to limit the extent of insertion of the gauge rod into a crank case or the like, an elongated resilient wire mounted for reciprocation along said gauge rod and extending along said gauging portion and said positioning portion to a point adjacent said handle portion, and wiper means comprising a resilient metallic band slidably surrounding said gauging portion in snug embracing relation thereto and secured to said wire for reciprocation by said wire along said gauging portion of said rod, said band having at least one resilient finger engaging one side of said gauging portion to wipe said one side and maintain said band in firm sliding contact with the other side of said gauging portion.

7. A self-wiping oil gauge rod of the character described comprising an elongated and relatively stiff gauge rod having a lower gauging portion, an intermediate positioning portion, and a handle portion, said intermediate positioning portion embodying a plurality of spaced resilient elements adapted to engage the walls of an opening to frictionally retain the gauge rod in a predetermined position, a positioning stop means mounted on said gauge rod intermediate said positioning portion and said handle portion and operable to limit the extent of insertion of the gauge rod into a crank case or the like, wiper means mounted on the gauging portion of said rod for longitudinal reciprocation therealong, and means for actuating said wiper means comprising an elongated resilient member secured to said wiping means and extending along said gauging portion and between certain of said spaced elements to a point adjacent said handle portion whereby said wiper means may be reciprocated along said gauging portion of said gauge rod while said gauge rod remains in its normal position in association with a crank case or the like.

8. An oil gauge rod for use in association with a fluid container having an opening in one wall, said device comprising an elongated relatively stiff gauge rod having a lower gauging portion, an intermediate positioning portion, said positioning portion having a longitudinally extending central strip struck therefrom so as to project laterally in one direction from the plane of said rod and having the adjacent portions of said rod in said positioning portion struck in the opposite direction so as to form laterally spaced elongated members for engagement with the other side of an opening, wiper means reciprocably mounted on said gauging portion of said rod, an elongated relatively stiff wire fixed to said wiper means and extending along one side of said rod so as to extend through the space between said spaced members, a positioning disc secured to said rod above said positioning portion, said disc having an opening therein through which said wire extends, and means on the upper end of said wire whereby said wire may be manually grasped and manipulated to reciprocate said wiper means along said gauging portion while said rod remains stationary in the opening of such a fluid container.

9. A device of the character described for use in association with a fluid container having an opening in one wall, said device comprising an elongated gauge rod having a relatively straight gauging portion constituting the lower end of said device, said device having a positioning portion above said gauging portion and having a handle located above said positioning portion and extending at an angle to said straight portion, wiper means reciprocably mounted on said gauging portion of said rod, an elongated relatively stiff wire fixed to said wiper means and extending along one side of said rod and bent along a relatively wide curve to extend past said handle at an angle to said straight portion, and means on said rod adjacent said positioning portion including a positioning disc and operable to guide said wire as it is reciprocated, and means on the upper end of said wire whereby said wire may be manually grasped and manipulated to reciprocate said wiper means along said gauging portion while said rod remains stationary in the opening of such a fluid container.

10. A device of the character described for use in association with a fluid container having an opening in one wall, said device comprising an elongated gauge rod formed from tubular material to provide a lower gauging portion, an intermediate positioning portion and an upper handle portion, a positioning disc secured to said rod intermediate said handle and positioning portions, said tubular rod in the lower end thereof being flattened and offset laterally from the axis of said tube to provide said gauging portion, said rod having an opening formed therein at said offset aligned with said axis of said tubular rod, wiper means reciprocably mounted on said gauging portion of said rod, an elongated relatively stiff wire fixed to said wiper means and extending through said opening and upwardly through said tubular rod, and means on the upper end of said wire whereby said wire may be manually grasped and manipulated to reciprocate said wiper means along said gauging portion while said rod remains stationary in the opening of such a fluid container.

ANGELO F. NAPLES.
SABASTIANO LANDO.